US009996829B1

(12) United States Patent
Baig et al.

(10) Patent No.: US 9,996,829 B1
(45) Date of Patent: Jun. 12, 2018

(54) SYSTEM FOR GLOBAL POINT-OF-SALE CAPABILITIES

(71) Applicant: Square, Inc., San Francisco, CA (US)

(72) Inventors: Rehman Baig, San Mateo, CA (US); Marc Hernandez, San Francisco, CA (US); Timothy Yip, Richmond, CA (US)

(73) Assignee: Square, Inc., San Francisco, CA (US)

( * ) Notice: Subject to any disclaimer, the term of this patent is extended or adjusted under 35 U.S.C. 154(b) by 0 days. days.

(21) Appl. No.: 15/390,918

(22) Filed: Dec. 27, 2016

(51) Int. Cl.
G06Q 20/20 (2012.01)
G06Q 20/10 (2012.01)
H04L 29/08 (2006.01)
G06Q 20/40 (2012.01)
G06Q 10/10 (2012.01)

(52) U.S. Cl.
CPC ....... G06Q 20/202 (2013.01); G06Q 10/1093 (2013.01); G06Q 20/102 (2013.01); G06Q 20/40 (2013.01); H04L 67/18 (2013.01)

(58) Field of Classification Search
CPC ...... G06Q 20/20; G06Q 20/202; G06Q 20/18; G06Q 20/204; G06Q 20/40
USPC .......................................................... 705/16
See application file for complete search history.

(56) References Cited

U.S. PATENT DOCUMENTS

2016/0063480 A1 3/2016 Ballesteros et al.

FOREIGN PATENT DOCUMENTS

EP 2 579 194 A1 4/2013
WO 2013/147904 A1 10/2013
WO 2014/174261 A1 10/2014

OTHER PUBLICATIONS

Novak, Edmund James. Security and Privacy for Ubiquitous Mobile Devices. The College of William and Mary, ProQuest Dissertations Publishing, 2016.*
International Search Report and Written Opinion for International Application No. PCT/US2017/063054, dated Feb. 13, 2018.

* cited by examiner

Primary Examiner — Florian M Zeender
Assistant Examiner — Fawaad Haider
(74) Attorney, Agent, or Firm — Lee & Hayes, PLLC

(57) ABSTRACT

Techniques for enabling transactions via a payment processing service for a merchant that is currently located outside of a particular region that the merchant utilizes the payment processing service for processing card-present transactions is described. A server associated with the payment processing service may receive, from a point-of-sale (POS) system, first payment data to satisfy a cost of a transaction between a customer and the merchant and may determine that the POS system is currently located outside of a region where the merchant utilizes the payment processing service to perform card-present transactions. The server may extract a portion of the first payment data, the portion of the first payment data corresponding to information required for a card-not-present transaction and may facilitate, based at least in part on the portion of the first payment data, a card-not-present transaction, instead of a card-present transaction, to authorize the cost of the transaction.

21 Claims, 4 Drawing Sheets

SYSTEM FOR GLOBAL POINT-OF-SALE CAPABILITIES

BACKGROUND

Retail transactions such as purchases may be performed with payment instruments such as credit cards or near-field communication (NFC)-enabled smart phones running a payment application. A traditional payment terminal may reside at a fixed location and may have a physical connection to a power source such as an AC outlet. The payment terminal may also be physically connected to a wired communication interface such as a phone line or Ethernet connection. The payment terminal receives payment information such as a credit card number from the payment instrument and communicates with a remote server, such as a payment processing service server and/or a payment processing service provider server, to determine whether the transaction is approved. Such traditional payment terminals are fixed in a single location and are configured to process card-present transactions for localized payment instruments.

Such a traditional payment terminal may not be suitable for many businesses. For instance, businesses that run special events, pop-up shops, festivals, concerts, and other similar businesses engage in transactions at disparate locations across the world. Some modernized payment terminals are configured to be mobile, enabling such businesses to engage in transactions at disparate locations across the world. In at least one example, applications running on a mobile device such as smart phone or tablet may provide a user interface to facilitate payment transactions and a communication interface for communicating with a payment processing service server and/or payment processing service provider server. In another example, a separate payment reader may be used to interface with the payment instrument. The payment reader may be portable and communicate with the mobile device. In some instances, configurations may limit the geographical region(s) where these mobile payment terminals may process transactions as card-present transactions. However, the nature of such businesses creates a need for the businesses to utilize the mobile payment terminals in locations outside of where the mobile payment terminals may process card-present transactions.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1:
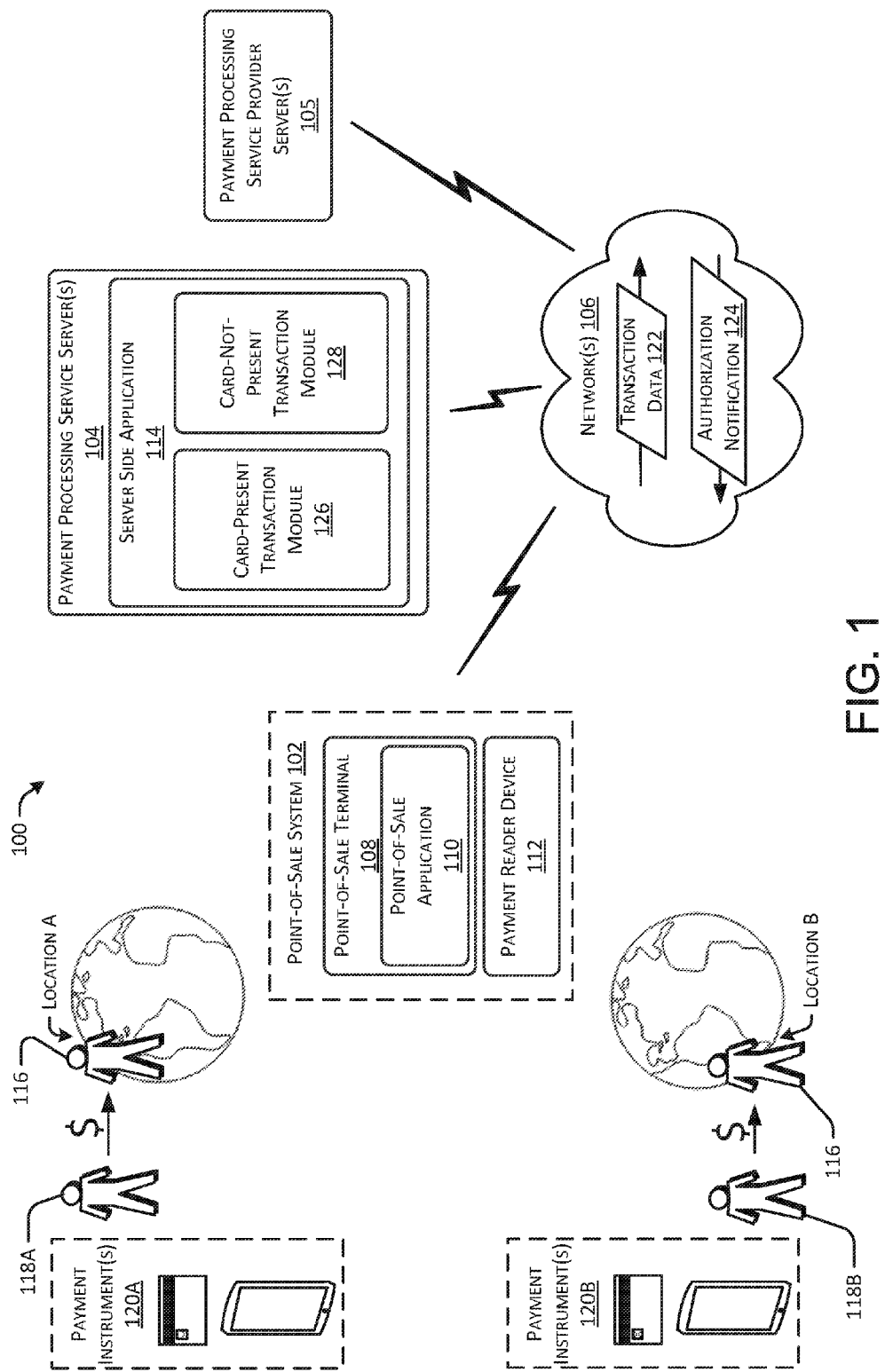
FIG. 1 depicts an illustrative block diagram of a payment system in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A point-of-sale (POS) system may include a POS terminal and a payment reader. The payment reader may physically interact with payment instruments such as magnetic stripe payment cards, EMV payment cards, and short-range communication (e.g., near field communication (NFC), radio frequency identification (RFID), Bluetooth®, Bluetooth® low energy (BLE), etc.) payment instruments. The POS terminal may provide a rich user interface, communicate with the payment reader, and communicate with a payment processing service server, which may communicate with payment processing service provider server(s). In this manner, the POS terminal and payment reader may collectively process transaction(s) between a merchant and customer(s).

POS systems may be mobile, such that POS terminals and payment readers may process transactions in disparate locations across the world. For various reasons, a payment processing service provider may contract with a payment processing service regarding where the payment processing service is permitted to collectively process card-present transactions between merchants that utilize POS systems serviced by the payment processing service and customers. As a non-limiting example, a payment processing service provider may contract with a payment processing service such that the payment processing service is permitted to process card-present transactions on behalf of a merchant via a POS system serviced by the payment processing service in one or more particular regions but is not permitted to process transactions on behalf of the merchant in any region that is not one of the one or more particular regions. For instance, a payment processing service provider may contract with a payment processing service such that the payment processing service is permitted to process card-present transactions on behalf of the merchant in the United States, Canada, and Australia, but is not permitted to process card-present transactions on behalf of the merchant in any other country. That is, if the merchant tries to transact with a customer in China via a card-present transaction using a POS system serviced by the payment processing service and the payment processing service processes the card-present transaction, the payment processing service may breach its contract with the payment processing service provider. Accordingly, the payment processing service may refrain from processing the card-present transaction (i.e., the payment processing service may not transmit the card-present transaction to the payment processing service provider) to avoid breaking its contract with the payment processing service provider.

For the purpose of this discussion, a card-present transaction is a transaction where both a customer and his or her payment instrument are physically present at the time of the transaction. Card-present transactions may be processed by swipes, dips, and/or taps. A swipe is a card-present transaction where a customer slides a card having a magnetic strip through a payment reader that captures payment data contained in the magnetic strip. A dip is a card-present transaction where a customer inserts a card having an embedded microchip (i.e., chip) into a payment reader chip-side first. The card remains in the payment reader until the payment reader prompts the customer to remove the card. While the card is in the payment reader, the microchip creates a one-time code which is sent from the POS system to a server associated with a payment processing service, a bank, and/or a card payment network (e.g., Mastercard®, VISA®, etc.) to be matched with an identical one-time code. A tap is a card-present transaction where a customer may tap or hover his or her electronic device such as a smart phone running a payment application over a payment reader to complete a transaction via short-range communication (e.g., NFC, RFID, Bluetooth®, BLE, etc.). Short-range communication enables the electronic device to exchange information with the payment reader. A tap may also be called a contactless payment. In some countries, a customer may engage in a tap using a TAP card instead of an electronic device.

Some merchants are mobile, such that they put on events (e.g., concerts, pop-up shops, festivals, special events, etc.) in multiple countries all over the world. In some examples, such events may be in countries where the payment processing service is not authorized to process card-present transactions on behalf of merchants utilizing POS systems serviced by the payment processing service. Techniques described herein enable a payment processing service to process card-not-present (CNP) transactions on behalf of such merchants. Such techniques utilize payment data received via an interaction between a payment instrument and a payment reader that resembles a card-present transaction (e.g., a swipe, dip, or tap) in regions where the payment processing service is not authorized to process card-present transactions on behalf of the merchants. That is, techniques described herein enable merchants to transact with customers in a manner that resembles a card-present transaction in a location where the payment processing service is not authorized to process card-present transactions. Based on determining that the merchant is in the location where the payment processing service is prohibited by a payment processing service provider from processing card-present transactions on behalf of the merchant utilizing a POS system serviced by the payment processing service, the payment processing service may facilitate a transaction with the payment processing service provider utilizing payment data accessed from a payment instrument during the interaction that resembles a card-present transaction to complete a CNP transaction instead of a card-present transaction.

Traditionally, a CNP transaction is a transaction where neither the customer nor the card are physically present at the point of sale and payment data is required to be manually keyed in (e.g., by a merchant, customer, etc.) to complete the transaction. CNP transactions are prevalent in mail orders, telephone orders, online orders, etc. Techniques described herein utilize payment data accessed from a card-present interaction (e.g., a swipe, dip, or tap) between a payment instrument and a payment reader to complete a CNP transaction. That is, techniques described herein enable CNP transactions without the traditional requirement of manual key entry.

It should be noted that while this disclosure describes enabling merchants to utilize POS systems associated with a payment processing service to process card-not-present (CNP) transactions between the merchants and customers in regions where the payment processing service is not authorized to process card present transactions, the techniques described herein may also be applicable to examples where a POS system is otherwise not configured (e.g., not certified, etc.) to process card present transactions.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some exemplary examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an illustrative block diagram of a payment system 100 in accordance with some examples of the present disclosure. In at least one example, the payment system 100 may include a POS system 102 that is communicatively coupled to one or more payment processing service servers 104, which may be communicatively coupled to one or more payment processing service provider servers 105, via one or more networks 106. The POS system 102 may include a POS terminal 108, storing a POS application 110, and a payment reader device 112. The payment processing service server(s) 104 may include a server side application 114.

These components of the payment system 100 facilitate electronic payment transactions between a merchant 116 and customers (e.g., customer 118A, customer 118B, etc.). In an example, the electronic payment transactions may result from interactions between the merchant 116 and a customer 118A that take place between the customer's payment instrument(s) 120A and the merchant's POS system 102. The customer 118A may have a payment instrument 120A such as a credit card having a magnetic stripe, an EMV chip card, or a short-range communication-enabled electronic device such as a smart phone running a payment application. The merchant 116 has a POS system 102 that is capable of processing payment information (e.g., encrypted payment card data and user authentication data) and transaction information (e.g., purchase amount and point-of-purchase information).

In one example, the POS system 102 may include a payment reader device 112 and a POS terminal 108. The POS terminal 108 may have a POS application 110 executing thereon. In one implementation, the POS terminal 108 may be a POS terminal operated and managed by a merchant. Furthermore, the POS terminal 108 may be of a varied hardware and/or software configuration, such that POS terminal 108 may be an Android device or an iOS device. The POS terminal 108 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. The POS terminal 108 may be connected to the payment reader device 112, which is capable of accepting a variety of payment instruments 120A, such as credit cards, debit cards, gift cards, short-range communication based payment instruments, and the like.

The payment reader device 112 may be a portable magnetic stripe card reader, optical scanner, smartcard (card with an embedded IC chip) reader (e.g., an EMV-compliant card reader or short-range communication enabled reader), RFID reader, or the like, configured to detect and obtain data off any payment instrument. Accordingly, the payment reader device 112 may include hardware implementation, such as slots, magnetic tracks, and rails with one or more sensors or electrical contacts to facilitate detection and acceptance of a payment instrument 120A. Additionally or optionally, the payment reader device 112 may also include a biometric sensor to receive and process biometric characteristics and process them as payment instruments, given that such biometric characteristics are registered with the payment system 100 and connected to a financial account with a payment processing service provider server 105.

Additional details associated with a POS system 102 are described below with reference to FIG. 2.

In some examples (e.g., for low-value transactions or for payment transactions that are less than a payment limit indicated by a payment instrument), the initial processing and approval of the payment transaction may be processed at POS system 102. In other examples, POS system 102 may communicate with payment processing service server(s) 104, which may communicate with payment processing service provider server(s) 105, over network(s) 106. Although payment processing service server(s) 104 may be operated by a single entity, in one example, payment processing service server(s) 104 may include any suitable number of servers operated by any suitable entities, such as a payment processing service. Similarly, although payment processing service provider server(s) 105 may be operated by a single entity, in one example, payment processing service provider server(s) 105 may include any suitable number of servers operated by any suitable entities, such as a payment processing service provider (e.g., banks, card payment networks, etc.).

The POS system 102, the payment processing service server(s) 104, and/or the payment processing service provider server(s) 105 may communicate payment information and transaction information to determine whether the transaction is authorized. For example, POS system 102 may provide encrypted payment data, user authentication data, purchase amount information, point-of-purchase information, etc. (collectively, transaction data 122) to payment processing service server(s) 104 over network(s) 106. Payment processing service server(s) 104 may send the transaction data 122 to the payment processing service provider server(s) 105 and the payment processing service provider server(s) 105 may determine whether the transaction is authorized based on the transaction data 122, as well as information relating to customer or merchant accounts. The payment processing service provider server(s) 105 may send an authorization notification 124 over network(s) 106 to the payment processing service server(s) 104, which may send the authorization notification 124 to POS system 102 over network(s) 106 to indicate whether the payment transaction is authorized. Payment processing service server(s) 104 may also transmit additional information such as transaction identifiers to POS system 102. In one example, the payment processing service server(s) 104 may include a server side application 114 for communicating with the POS system 102 and/or payment processing service provider server(s) 105 to permit or reject payment transactions. Additional details associated with the payment processing service server(s) 104 are described below with reference to FIG. 2.

Based on the authentication notification 124 that is received by the POS system 102 from payment processing service server(s) 104, the merchant 116 may indicate to the customer 118A whether the transaction has been approved. In some examples, such as a chip card payment instrument, approval may be indicated at the POS system 102, for example, at a screen of the POS system 102. In other examples, such as a smart phone or watch operating as a short-range communication payment instrument, information about the approved transaction and additional information (e.g., receipts, special offers, coupons, or loyalty program information) may be provided to the short-range communication payment instrument for display at a screen of the smart phone or watch or storage in memory.

As described above, POS systems may be mobile, such that POS terminals and payment readers may process transactions in disparate locations across the world. Payment processing service providers may contract with a payment processing service to establish limitations on where the payment processing service is permitted to process card-present transactions on behalf of merchants utilizing mobile POS systems serviced by the payment processing service. As an example, the payment processing service associated with payment processing service server(s) 104 may contract with a payment processing service provider to establish where the payment processing service is permitted to process card-present transactions on behalf of the merchant 116 when the merchant 116, and corresponding POS system 102, is located in Location A. Accordingly, based at least in part on determining that the merchant 116, and corresponding POS system 102, is in Location A, the payment processing service server(s) 104 may process the transaction data 122 in a card-present transaction module 126 associated with the server side application 114. The card-present transaction module 126 may process the transaction data 122 and communicate with the payment processing service provider server(s) 105, to determine whether the transaction data 122 is authorized for a transaction between the merchant 116 and a customer 118A. The card-present transaction module 126 may provide data to the server side application 114 indicating whether the transaction data 122 is authorized for the transaction. The server side application 114 may send an authorization notification 124 to the POS system 102 signaling whether the transaction data 122 is authorized for the transaction.

Some merchants may put on events (e.g., concerts, pop-up shops, festivals, special events, etc.) in disparate locations across the world, as described above. In an example, the merchant 116 may travel to a location where the payment processing service is not authorized to process card-present transactions between the merchant 116 and customers. As shown in FIG. 1, the merchant 116 may travel from Location A to Location B. Pursuant to a contract with the payment processing service provider, the payment processing service may not be authorized to process card-present transactions between the merchant 116 and customers (e.g., customer 118B) in Location B. Accordingly, based at least in part on determining that the merchant 116, and corresponding POS system 102, is in Location B, the payment processing service server(s) 104 may process the transaction data 122 in a card-not-present transaction module 128 associated with the server side application 114. That is, the POS system 102 may access transaction data 122 from an interaction that resembles a card-present transaction between the POS system 102 and a payment instrument 120B of a customer 118B. The POS system 102 may send the transaction data 122 to the payment processing service server(s) 104. Because the merchant 116 is not authorized to utilize the POS system 102 serviced by the payment processing service to process card-present transactions in Location B, the card-not-present transaction module 128 may process the transaction data 122 instead of the card-present transaction module 126. That is, the card-not-present transaction module 128 may communicate with the payment processing service provider server(s) 105 to determine whether the transaction data 122 is authorized for a transaction between the merchant 116 and a customer 118B. The card-not-present transaction module 128 may provide data to the server side application 114 indicating whether the transaction data 122 is authorized for the transaction. The server side application 114 may send an authorization notification 124 to the POS system 102 signaling whether the transaction data 122 is authorized for the transaction.

Figure 2:
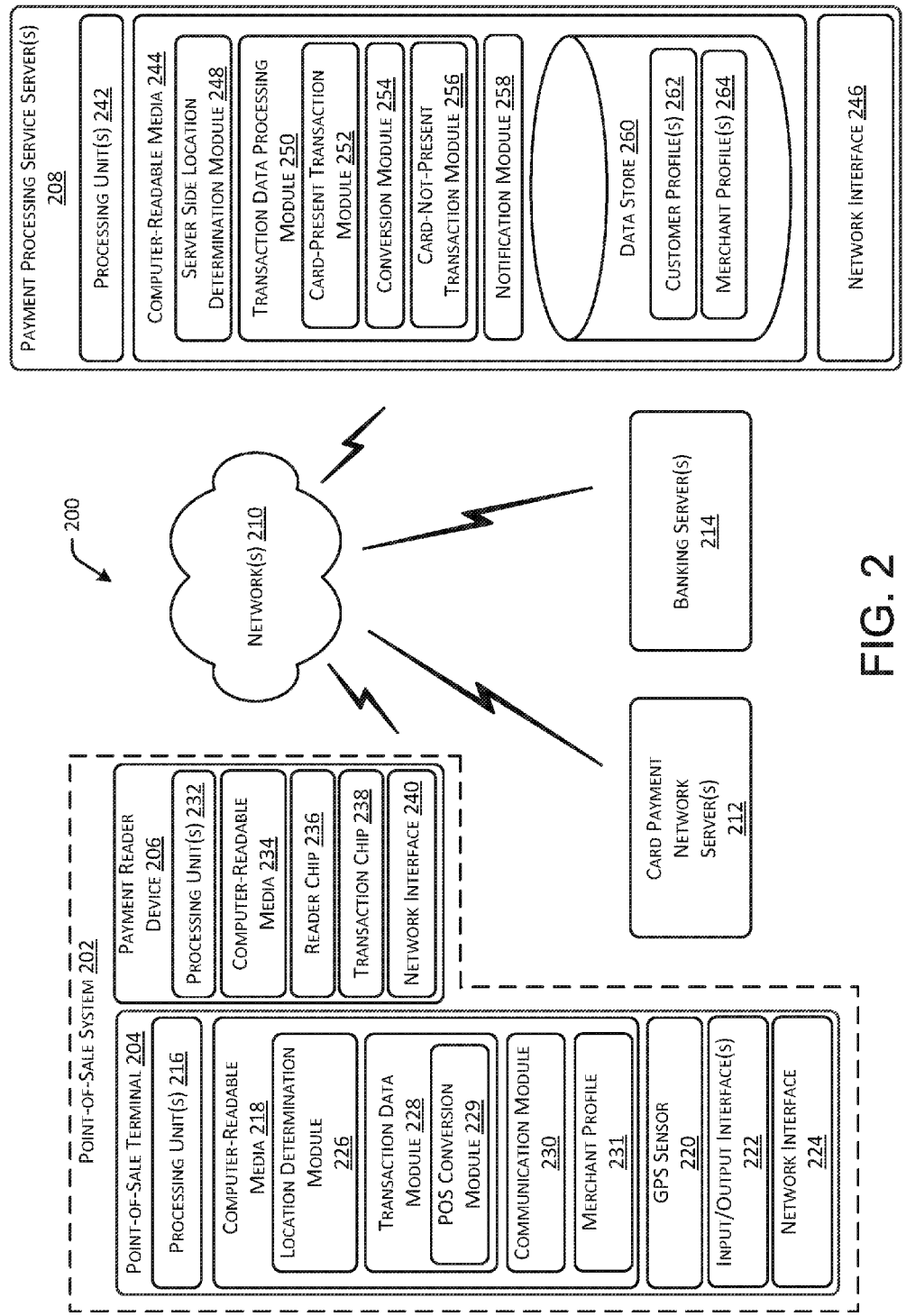
FIG. 2 depicts an illustrative block diagram showing additional details of the payment system in accordance with some examples of the present disclosure.

FIG. 2 depicts an illustrative block diagram of a payment system 200 in accordance with some examples of the present disclosure. Payment system 200 may correspond to payment system 100, described above with reference to FIG. 1. Payment system 200 may include a POS system 202, including a POS terminal 204 and a payment reader device 206. POS system 202, POS terminal 204, and payment reader device 206 may correspond to POS system 102, POS terminal 108, and payment reader device 112, respectively, as described above with reference to FIG. 1. Payment system 200 may additionally include payment processing service server(s) 208, which communicate with the POS system 202 via one or more networks 210. Payment processing service server(s) 208 may correspond to payment processing service server(s) 104 described above with respect to FIG. 1. Network(s) 210 may correspond to network(s) 106 described above with respect to FIG. 1. Additionally, payment system 200 may include one or more card network servers 212 (e.g., MasterCard®, VISA®, etc.) and/or one or more banking servers 214, which may communicate with the payment processing service server(s) 208 via the network(s) 210. The one or more card network servers 212 and/or one or more banking servers 214 may correspond to the one or more payment processing service provider servers 105 described above with reference to FIG. 1.

POS terminal 204 may include processing unit(s) 216, computer-readable media 218, a global positioning system (GPS) sensor 220, input/output interface(s) 222, and a network interface 224. The processing unit(s) 216 of the POS terminal 204 may execute one or more modules and/or processes to cause the POS terminal 204 to perform a variety of functions, as set forth above and explained in further detail in the following disclosure. In some examples, the processing unit(s) 216 may include a central processing unit (CPU), a graphics processing unit (GPU), both CPU and GPU, or other processing units or components known in the art.

Additionally, each of the processing unit(s) 216 may possess its own local memory, which also may store program modules, program data, and/or one or more operating systems. Depending on the exact configuration and type of the POS terminal 204, the computer-readable media 218 may include volatile memory (such as RAM), non-volatile memory (such as ROM, flash memory, miniature hard drive, memory card, or the like), or some combination thereof. The POS terminal 204 may include a GPS sensor 220, for receiving geolocation and time information (i.e., location data) associated with the POS terminal 204. In various examples, the POS terminal 204 may also have input/output interface(s) 222. Examples of input/output interface(s) 222 may include a keyboard, a mouse, a pen, a voice input device, a touch input device, a display, etc. Furthermore, the POS terminal 204 may include a network interface 224 for interfacing with the network(s) 210, as described below.

In at least one example, the computer-readable media 218 may include one or more modules for determining a location of a POS system 202, accessing payment data, and communicating with payment processing service server(s) 208 that are associated with a payment processing service. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 216) to configure the POS terminal to execute instructions and to perform operations described herein. The module(s) may include a location determination module 226, a transaction data module 228, which may include a POS conversion module 229, and a communication module 230. In at least one example, the location determination module 226, the transaction data module 228, the POS conversion module 229, and the communication module 230 may be associated with a POS application, such as POS application 110, described above with reference to FIG. 1.

The location determination module 226 may access data to determine the current location of the POS terminal 204. For the purpose of this discussion, the current location of the POS terminal 204 may indicate the current location of the POS system 202 and accordingly, the current location of the merchant associated with the POS system 202.

In an example, the location determination module 226 may prompt the merchant associated with the POS system 202 to expressly indicate its current location. For instance, the location determination module 226 may cause a user interface to be presented via a display of the POS terminal 204 which may solicit the current location of the POS system 202. In such an example, the merchant may provide its current location via the input/output interface(s) 222.

In at least one example, the location determination module 226 may receive location data from the GPS sensor 220. The location determination module 226 may determine the current location of the POS system 202 based on the location data. In additional or alternative examples, the location determination module 226 may access geographic location information associated with the IP address that the POS terminal 204 is using to communicate via the network(s) 210. In such examples, the geographic location information associated with the IP address may indicate the current location of the POS system 202. Accordingly, the location determination module 226 may determine the current location of the POS system 202 based on the geographic location information associated with the IP address.

Moreover, in another example, the location determination module 226 may access transaction data received from the payment reader device 206, below. The transaction data may include payment data associated with payment instruments associated with a particular region (e.g., Canadian banking cards, German credit cards, etc.). The location determination module 226 may determine that a number transactions that are associated with payment instruments from a particular region is above a threshold number and accordingly, may determine the current location of the POS system 202 corresponds to the particular region. For instance, if a number of transactions associated with a German Eurocard is above a threshold number, the location determination module 226 may determine that the POS system 202 is currently located in Germany.

In some examples, the location determination module 226 may access data associated with the merchant corresponding to the POS system 202. Such data may include event data, which may identify events, dates of events, locations of events, etc. In such examples, the location determination module 226 may receive payment data and may determine that payment data is associated with an event, a date of an event, etc. Based at least in part on the event data, the location determination module 226 may determine that the current location of the POS system 202 corresponds to the location of the event.

In an additional and/or alternative example, the location determination module 226 may access settings associated with one or more applications running on the POS terminal 204. In such examples, settings may provide an indication of the current location of the POS system 202. Based on such an indication, the location determination module 226 may determine the current location of the POS system 202.

In some examples, the location determination module 226 may provide the current location to the communication module 230, which may send an indication to the payment processing service server(s) 208 identifying the current location of the POS system 202. In alternate examples, some or all of the location determination functionality may be performed by a server side location determination module 248, as described below.

In at least one example, the location determination module 226 may determine that the POS system 202 is in a region where the payment processing service is not authorized to process card-present transactions on behalf of the merchant. In such an example, the location determination module 226 may access data associated with a merchant profile 231, stored in the computer-readable media 218, to determine the region(s) where the payment processing service is authorized to process card-present transactions on behalf of the merchant. In at least one example, the merchant profile 231 may store data associated with a merchant including, but not limited to, data including information about the merchant (e.g., name of the merchant, geographic location of the merchant, types of goods or services offered by the merchant, operating hours of the merchant, etc.), information about events associated with the merchant (e.g., past and upcoming events, dates of events, locations of events, etc.), accounting information associated with the merchant (e.g., bank(s) that the merchant banks with, etc.), contractual information associated with the merchant (e.g., terms of a contract between the merchant and the payment processing service), transactional information associated with the merchant (e.g., transactions conducted by the merchant, goods and/or service associated with the transactions, total spends of each of the transactions, parties to the transactions, dates, times, and/or locations associated with the transactions, etc.), etc. The location determination module 226 may access the contractual information associated with a merchant profile 231. In at least one example, the contractual information associated with the merchant profile 231 may include terms that are based on contracts between the payment processing service and payment processing service provider(s), such as regions where the payment processing service is permitted to process card-present transactions on behalf of the merchant. The location determination module 226 may compare the region(s) where the payment processing service is authorized to process card-present transactions on behalf of the merchant with the current location of the POS system 202 and the location determination module 226 may determine that the current location of the POS system 202 is outside of one of the region(s) where the payment processing service is authorized to process card-present transactions on behalf of the merchant.

The transaction data module 228 may receive payment data from the payment reader device 206, described below. The payment data may include a name of the customer, an address of the customer, a type (e.g., credit, debit, etc.) of a payment instrument from which the payment data is accessed, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration date associated with the payment instrument, a primary account number (PAN) corresponding to the customer (which may or may not match the number associated with the payment instrument), restrictions on what types of charges/debts may be made, etc. In some examples, the payment data may be encrypted. As a default, the payment data may be in a card-present transaction format. That is, the payment data may be in a format that may be processed to complete a card-present transaction. In addition to payment data, the transaction data module 228 may receive user authentication data, purchase amount information, and point-of-purchase information from the payment reader device 206.

In some examples, the payment data may be converted from a card-present transaction format into a CNP transaction format at the payment processing service server(s) 208.

In other examples, at least some of the payment data may be converted from the card-present transaction into the CNP transaction format on the POS terminal 204. In such examples, the transaction data module 228 may include a POS conversion module 229. The POS conversion module 229 may receive an indication from the location determination module 226 indicating that the current location of the POS system 202 is outside of one of the region(s) where the payment processing service is authorized to process card-present transactions on behalf of the merchant. Accordingly, in at least one example, the POS conversion module 229 may convert the payment data in the card-present transaction format into a CNP transaction format. A CNP transaction format may be a format of payment data that may be processed to complete a CNP transaction. In an example, the POS conversion module 229 may extract at least a portion of the payment data that is required for CNP transactions and convert at least the portion of the payment data into a CNP transaction format. In at least one example, the portion of the payment data may include at least a name of the customer, a number associated with a payment instrument of the customer, a verification value (e.g., PVKI, PVV, CVV, CVC, etc.) associated with the payment instrument, and an expiration date associated with the payment instrument.

The communication module 230 may send and receive data from the payment processing service server(s) 208. For instance, in one example, the communication module 230 may provide payment data, user authentication data, purchase amount information, point-of-purchase information, etc. (collectively, transaction data) to the payment processing service server(s) 208. In some examples, the communication module 230 may send an indication to the payment processing service server(s) 208 identifying the current location of the POS system 202. Such indications may be sent with transaction data or at a predetermined frequency, after a lapse of a predetermined period of time, any time the POS system 202 changes locations, etc. In at least one example, the communication module 230 may receive, from the location determination module 226, an indication that the POS system 202 is outside of a region where the payment processing service provider is authorized to process card-present transactions on behalf of the merchant. In at least one example where the payment data has not been converted into the CNP transaction format, the indication may include instructions to send the payment data directly to a conversion module associated with the payment processing service server(s) 208, described below. Alternatively, in an example where the POS conversion module 229 has already converted the payment data to the CNP transaction format, the indication may include instructions to send the payment data directly to a card-not-present transaction module associated with the payment processing service server(s) 208, described below.

Additionally, the communication module 230 may receive notifications from the payment processing service server(s) 208 signaling the success or failure of authorization of the payment data for various transactions. In some examples, the communication module 230 may generate user interfaces for presentation via an output interface, described above. In some examples, the user interfaces may communicate that a transaction was successful (i.e., payment data is authorized for the transaction), unsuccessful (i.e., payment data is not authorized for the transaction), or requires more information to proceed. In an example where a transaction requires more information to proceed, a user interface may be configured to prompt a merchant and/or customer for additional information to complete a transaction. In such an example, the user interface may be presented via the input/output interface(s) 222.

As described above, the POS terminal 204 may be associated with a payment reader device 206. In one example, payment reader device 206 may be a wireless communication device that communicates wirelessly with an interactive electronic device such as a POS terminal 204, for example, using Bluetooth®, BLE, NFC, RFID, etc. In another example, payment reader device 206 may be coupled to an interactive electronic device such as a POS terminal 204, for example, by being insertable into a connector mechanism (e.g., phone jack, headphone jack, etc.) of a smart phone or tablet. That is, in other examples, the payment reader device 206 may be coupled to the POS terminal 204 via a wired connection. The payment reader device 206 may interact with a payment instrument via a tap, dip, or swipe to obtain payment data associated with a customer. Payment reader device 206 may include processing unit(s) 232, computer-readable media 234, a reader chip 236, a transaction chip 238, and a network interface 240.

The processing unit(s) 232 of the payment reader device 206 may execute one or more modules and/or processes to cause the payment reader device 206 to perform a variety of functions, as set forth above and explained in further detail in the following disclosure. In some examples, the processing unit(s) 232 may include a CPU, GPU, a cryptographic processing unit (CrPU), combinations of the above, or processing units or components known in the art. Additionally, each of the processing unit(s) 232 may possess its own local memory, which also may store program modules, program data, and/or one or more operating systems. Depending on the exact configuration and type of the payment reader device 206, the computer-readable media 234 may include volatile memory (such as RAM), non-volatile memory (such as ROM, flash memory, miniature hard drive, memory card, or the like), or some combination thereof.

The reader chip 236 may perform functionality to control the operations and processing of the payment reader device 206. That is, the reader chip 236 may perform functionality to control payment interfaces (e.g., a contactless interface, a contact interface, etc.), a wireless communication interface, a wired interface, a power supply, a user interface (e.g., a signal condition device (FPGA)), etc. The transaction chip 238 may perform functionality relating to processing of payment transactions, interfacing with payment instruments, cryptography, and other payment-specific functionality. That is, the transaction chip 238 may access payment data associated with a payment instrument and may provide the payment data to the transaction data module 228. The payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc. Additionally, the transaction chip 238 may encrypt the payment data upon receiving the payment data.

It should be understood that in some examples, the reader chip 236 may have its own processing unit(s) and computer-readable media and/or the transaction chip 238 may have its own processing unit(s) and computer-readable media. In other examples, the functionality of reader chip 206 and transaction chip 220 may be embodied in a single chip or a plurality of chips, each including any suitable combination of processing units and computer-readable media to collectively perform the functionalities of reader chip 236 and transaction chip 238 as described herein.

As described above, the payment reader device 206 may also include a network interface 240 for interfacing with the network(s) 210, as described below.

The payment processing service server(s) 208 may exchange data with the POS system 202 via network(s) 210, as described above. In an example, the payment processing service server(s) 208 may be associated with a payment processing service. Examples support scenarios where device(s) that may be included in the payment processing service server(s) 208 may include one or more computing devices that operate in a cluster or other configuration to share resources, balance load, increase performance, provide fail-over support or redundancy, or for other purposes. Device(s) that may be included in the payment processing service server(s) 208 may include any type of computing device having processing units operably connected to computer-readable media such as via a bus, which in some instances may include one or more of a system bus, a data bus, an address bus, a PCI bus, a Mini-PCI bus, and any variety of local, peripheral, and/or independent buses. In at least one configuration, the computer-readable media of the payment processing service server(s) 208 may include module(s) as described above. Alternatively, or in addition, the functionality described herein may be performed, at least in part, by one or more hardware logic components such as accelerators. For example, and without limitation, illustrative types of hardware logic components that may be used include FPGAs, Application-Specific Integrated Circuits (ASICs), Application-Specific Standard Products (ASSPs), System-on-a-Chip Systems (SOCs), Complex Programmable Logic Devices (CPLDs), etc.

In an example, the payment processing service server(s) 208 may include processing unit(s) 242, computer-readable media 244, and a network interface 246. The processing unit(s) 242 of the payment processing service server(s) 208 may execute one or more modules and/or processes to cause the payment processing service server(s) 208 to perform a variety of functions, as set forth above and explained in further detail in the following disclosure. In some examples, the processing unit(s) 242 may include a CPU, GPU, both CPU and GPU, or other processing units or components known in the art. Additionally, each of the processing unit(s) 242 may possess its own local memory, which also may store program modules, program data, and/or one or more operating systems. Depending on the exact configuration and type of the payment processing service server(s) 208, the computer-readable media 244 may include volatile memory (such as RAM), non-volatile memory (such as ROM, flash memory, miniature hard drive, memory card, or the like), or some combination thereof. The payment processing service server(s) 208 may include a network interface 246 for interfacing with the network(s) 210, as described below.

In at least one example, the computer-readable media 244 may include one or more modules for receiving payment data from a POS system 202, determining whether to process the payment data as a card-present or CNP transaction, and communicating with the POS system 202 regarding authorization of the payment data for various transactions. The one or more modules may be implemented as more modules or as fewer modules, and functions described for the modules may be redistributed depending on the details of the implementation. As described above, term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 242) to configure the payment processing service server(s) 208 to execute instructions and to perform operations described herein. The module(s) may include a server side location determination module 248, a transaction data processing module 250, a card-present transaction module 252, a conversion module 254, a card-not-present transaction module 256, and a notification module 258. In at least one example, the server side location determination module 248, the transaction data processing module 250, the card present transaction module 252, the conversion module 254, the card-not-present transaction module 256, and the notification module 258 may be associated with a server side application, such as server side application 114, described above with reference to FIG. 1. Additionally, the computer-readable media 244 may include a data store 260 which may store customer profile(s) 262 and merchant profile(s) 264.

The server side location determination module 248 may access data to determine the current location of the POS terminal 204. As described above, the current location of the POS terminal 204 may indicate the current location of the POS system 202 and accordingly, the current location of the merchant associated with the POS system 202. In some examples, as described above, a location determination module 226 associated with the POS system 202 may determine the current location of the POS system 202 and the communication module 230 may provide an indication identifying the current location of the POS system 202 to the payment processing service server(s) 208. In such examples, the server side location determination module 248 may determine the current location of the POS system 202 based on the indication from the POS system 202. In other examples, the server side location determination module 248 may receive data (e.g., location data, transaction data, etc.) from the POS system 202 and may determine the current location of the POS system 202 based on the data received from the POS system 202.

In at least one example, the server side location determination module 248 may receive location data from the POS terminal 204. The server side location determination module 248 may determine the current location of the POS system 202 based on the location data. In additional or alternative examples, the server side location determination module 248 may access geographic location information associated with the IP address that the POS terminal 204 is using to communicate with the payment processing service server(s) 208 via the network(s) 210. In such examples, the geographic location information associated with the IP address may indicate the current location of the POS system 202. The server side location determination module 248 may determine the current location of the POS system 202 based on the geographic location information associated with the IP address.

Moreover, in another example, the server side location determination module 248 may access transaction data received from the payment reader device 206. The transaction data may include payment data associated with payment instruments associated with a particular region (e.g., Canadian banking cards, German credit cards, etc.). The server side location determination module 248 may determine that a number transactions that are associated with payment instruments from a particular region is above a threshold number and accordingly, may determine the current location of the POS system 202 corresponds to the particular region. For instance, if a number of transactions associated with a German Eurocard is above a threshold number, the server side location determination module 248 may determine that the POS system 202 is currently located in Germany.

In some examples, the server side location determination module 248 may access data associated with the merchant corresponding to the POS system 202. Such data may include event data, which may identify events, dates of events, locations of events, etc. In such examples, the server side location determination module 248 may receive payment data and may determine that payment data is associated with an event, a date of an event, etc. Based at least in part on the event data, the server side location determination module 248 may determine that the current location of the POS system 202 corresponds to the location of the event.

The transaction data processing module 250 may receive transaction data from the POS system 202. As described above, the transaction data may include payment data, user authentication data, purchase amount information, point-of-purchase information, etc. The transaction data processing module 250 may determine how to process the transaction data based on the current location of the POS system 202. As described above, as a default, payment data associated with the transaction data may be in a card-present transaction format. That is, the payment data may be in a format that may be processed to complete a card-present transaction. In alternative examples, the payment data associated with the transaction data may be in a CNP transaction format when it is received from the POS system 202. In at least one example, the payment data may be encrypted. In such an example, the transaction data processing module 250 may decrypt the payment data.

In an example, the transaction data processing module 250 may determine that the POS system 202 is currently located in a region that the payment processing service is authorized to process card-present transactions on behalf of merchants. In at least one example, the transaction data processing module 250 may access data associated with a merchant profile 264, described below, to determine the region(s) where the payment processing service is authorized to process card-present transactions on behalf of the merchant. The transaction data processing module 250 may compare the region(s) where the payment processing service is authorized to process card-present transactions on behalf of the merchant with the current location of the POS system 202. The transaction data processing module 250 may determine that the current location of the POS system 202 is within one of the region(s) where the payment processing service is authorized to process card-present transactions on behalf of the merchant. Accordingly, the transaction data processing module 250 may provide the payment data in the card-present transaction format to the card-present transaction module 252. The card-present transaction module 252 may correspond to the card-present transaction module 126, described above with reference to FIG. 1. The transaction data processing module 250 may also provide other transaction data to the card-present transaction module 252.

The card-present transaction module 252 may facilitate authorization of the card-present transaction. That is, the card-present transaction module 252 may send a request for authorization of the payment data for a cost of a transaction to the card payment network server(s) 212 and/or the banking server(s) 214. The card payment network server(s) 212 and/or the banking server(s) 214 may process the payment data, in view of the transaction data and other data associated with the customer, and send a response back to the card-present transaction module 252 signaling whether the transaction was successful (i.e., whether the payment data is authorized for the cost of the transaction).

In an example, the transaction data processing module 250 may determine that the POS system 202 is currently located outside of a region that the payment processing service is authorized to process card-present transactions. In at least one example, the transaction data processing module 250 may access data associated with a merchant profile 264, described below, to determine the region(s) where the payment processing service provider is authorized to process card-present transactions on behalf of the merchant. The transaction data processing module 250 may compare the region(s) where the payment processing service provider is authorized to process card-present transactions on behalf of the merchant with the current location of the POS system 202. The transaction data processing module 250 may determine that the current location of the POS system 202 is outside of the region(s) where the payment processing service provider is authorized to process card-present transactions on behalf of the merchant. Accordingly, the transaction data processing module 250 may provide the payment data in the card-present transaction format to the conversion module 254, instead of the card-present transaction module 252.

The conversion module 254 may convert the payment data in the card-present transaction format into a CNP transaction format. A CNP transaction format may be a format of payment data that may be processed to complete a CNP transaction. In an example, the conversion module 254 may extract at least a portion of the payment data that is required for CNP transactions and convert at least the portion of the payment data into a CNP transaction format. In at least one example, the portion of the payment data may include at least a name of the customer, a number associated with a payment instrument of the customer, a verification value associated with the payment instrument, and an expiration date associated with the payment instrument. The conversion module 254 may provide the payment data in the CNP transaction format to the card-not-present transaction module 256.

In an alternative example, the transaction data processing module 250 may not determine whether to send payment data to the card-present transaction module 252 or the conversion module 254. In such an example, the location determination module 226 associated with the POS terminal 204 may determine that the POS system 202 is located outside of a region that the payment processing service is authorized to utilize the POS system 202 to process card-present transactions and communication module 230 may send an indication instructing the payment processing service server(s) 208 to send the associated payment data (in the card-present transaction format) directly to the conversion module 254, as described above. In alternative examples, the POS conversion module 229 may convert the payment data into a CNP transaction format and the communication module 230 may send an indication instructing the payment processing service server(s) 208 to send the associated payment data (in the card-present transaction format) directly to the card-not-present transaction module 256, as described above.

The card-not-present transaction module 256 may facilitate authorization of the CNP transaction using the payment data in the CNP transaction format. That is, the card-not-present transaction module 256 may send a request for authorization of the payment data for a cost of the transaction to the card payment network server(s) 212 and/or the banking server(s) 214 as if the card-not-present transaction module 256 was processing an online order or other CNP transaction. The card payment network server(s) 212 and/or the banking server(s) 214 may process the payment data in the CNP transaction format, in view of the transaction data and other data associated with the customer, and send a response back to the card-not-present transaction module 256 signaling whether the transaction was successful (i.e., whether the payment data is authorized for the cost of the transaction).

The notification module 258 may send notifications to the POS system 202. More specifically, in at least one example, the notification module 258 may send notifications to the communication module 230. The notifications may signal whether transactions were successful. For instance, based at least in part on the card payment network server(s) 212 and/or the banking server(s) 214 sending a response back to the card-present transaction module 252 and/or the card-not-present transaction module 256 signaling that a transaction was successful (i.e., the payment data is authorized for the cost of the transaction), the notification module 258 may send a notification to the communication module 230 signaling that the transaction was successful. Or, based at least in part on the card payment network server(s) 212 and/or the banking server(s) 214 sending a response back to the card-present transaction module 252 and/or the card-not-present transaction module 256 signaling that a transaction was not successful (i.e., the payment data is not authorized for the cost of the transaction), the notification module 258 may send a notification to the communication module 230 signaling that the transaction was not successful. Moreover, in an example, additional information may be required for the card payment network server(s) 212 and/or the banking server(s) 214 to authorize a transaction. In such examples, the card payment network server(s) 212 and/or the banking server(s) 214 may send a response back to the card-present transaction module 252 and/or the card-not-present transaction module 256 signaling that a transaction was not successful (i.e., the payment data is not authorized for the cost of the transaction) and that additional information is needed to complete the transaction. Accordingly, the notification module 258 may send a notification to the communication module 230 signaling that the transaction was not successful and that additional information is needed to complete the transaction. As a result, the communication module 230 may cause a prompt to be presented to the merchant and/or customer to solicit additional information, as described above.

The data store 260 may be configured to store data so that it may be accessible, manageable, and updatable. In at least one example, the data store 260 may include customer profile(s) 262 associated with individual customers. One or more data items may be mapped to, or otherwise associated with, the customer profile(s) 262. For instance, data including demographic information about a customer (e.g., name, address, age, birthdate, profession, marital status, etc.), contact information associated with the customer (e.g., telephone number(s), email address(es), etc.), preferences of the customer (e.g., emailed or paper receipt, etc.), payment instruments associated with the customer (e.g., credit cards, debit card, gift cards, short-range communication based payment instruments, etc.), etc. may be mapped to a customer profile corresponding to the customer.

Additionally, in at least one example, the data store 260 may include merchant profile(s) 264. One or more data items may be mapped to, or otherwise associated with, the merchant profile(s) 264. For instance, data including information about a merchant (e.g., name of the merchant, geographic location of the merchant, types of goods or services offered by the merchant, operating hours of the merchant, etc.), information about events associated with the merchant (e.g., past and upcoming events, dates of events, locations of events, etc.), accounting information associated with the merchant (e.g., bank(s) that the merchant banks with, etc.), contractual information associated with the merchant (e.g., terms of a contract between the merchant and the payment processing service), and transactional information associated with the merchant (e.g., transactions conducted by the merchant, goods and/or service associated with the transactions, total spends of each of the transactions, parties to the transactions, locations associated with the transactions, etc.), etc. may be mapped to a merchant profile corresponding to the merchant. In some examples, some of the data including information about a merchant may be stored at the POS terminal 204 in addition to, or as an alternative to, the merchant profile(s) 264.

The payment processing service server(s) 208 may be configured to communicate with card payment network server(s) 212 and/or banking server(s) 214 via network(s) 210 to conduct financial transactions electronically. Examples support scenarios where device(s) that may be included in the card payment network server(s) 212 and/or banking server(s) 214 may include one or more computing devices that operate in a cluster or other configuration to share resources, balance load, increase performance, provide fail-over support or redundancy, or for other purposes. Device(s) that may be included in the card payment network server(s) 212 and/or banking server(s) 214 may include any type of computing device having processing units operably connected to computer-readable media such as via a bus, which in some instances may include one or more of a system bus, a data bus, an address bus, a PCI bus, a Mini-PCI bus, and any variety of local, peripheral, and/or independent buses. In at least one configuration, the computer-readable media of the card payment network server(s) 212 and/or banking server(s) 214 may include module(s) as described above. Alternatively, or in addition, the functionality described herein may be performed, at least in part, by one or more hardware logic components such as accelerators. For example, and without limitation, illustrative types of hardware logic components that may be used include FPGAs, ASICs, ASSPs, SOCs, CPLDs, etc. In at least one example, the card payment network server(s) 212 and/or banking server(s) 214 may each include one or more applications for processing transactions on behalf of the card payment network(s) and/or bank(s), respectively. Furthermore, the card payment network server(s) 212 and/or banking server(s) 214 may each include network interfaces for interfacing with the network(s) 210, as described below.

In an example, the payment processing service server(s) 208 may communicate with an acquiring bank, and/or an issuing bank, and/or a bank maintaining customer accounts for electronic payments. An acquiring bank may be a registered member of a card association (e.g., Visa®, MasterCard®), and may be part of a card payment network. An issuing bank may issue payment cards to customers, and may pay acquiring banks for purchases made by cardholders to which the issuing bank has issued a payment card. Accordingly, in some examples, banking server(s) 214 associated with an acquiring bank may be included in the payment system 200 and may communicate with the banking server(s) 214 associated with of a card-issuing bank to obtain payment. Further, in some examples, the customer may use a debit card or gift card instead of a credit card, in which case, the banking server(s) 214 associated with a bank or other institution corresponding to the debit card or gift card may receive communications regarding a transaction in which the customer is participating. Additionally, there may be banking server(s) of other financial institutions involved in some types of transactions or in alternative system architectures, and thus, the foregoing are merely several examples for discussion purposes.

Network(s) 210 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 210 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, the POS system 202, the payment processing service server(s) 208, the card payment network server(s) 212, and/or the banking server(s) 214 may communicatively couple to network(s) 210 in any manner, such as by a wired or wireless connection. Network(s) 210 may also facilitate communication between the POS system 202, the payment processing service server(s) 208, the card payment network server(s) 212, and/or the banking server(s) 214. In turn, network interfaces (e.g., network interface 224, network interface 240, and network interface 246) may be any network interface hardware components that may allow POS system 202, the payment processing service server(s) 208, the card payment network server(s) 212, and/or the banking server(s) 214 to communicate over the network(s) 210. For example, in a particular implementation, the network interface 224 of the POS terminal 204 may include short-range communication capabilities for performing the communications involved in POS operations between the POS terminal 204 and the payment reader device 206.

Figure 3:
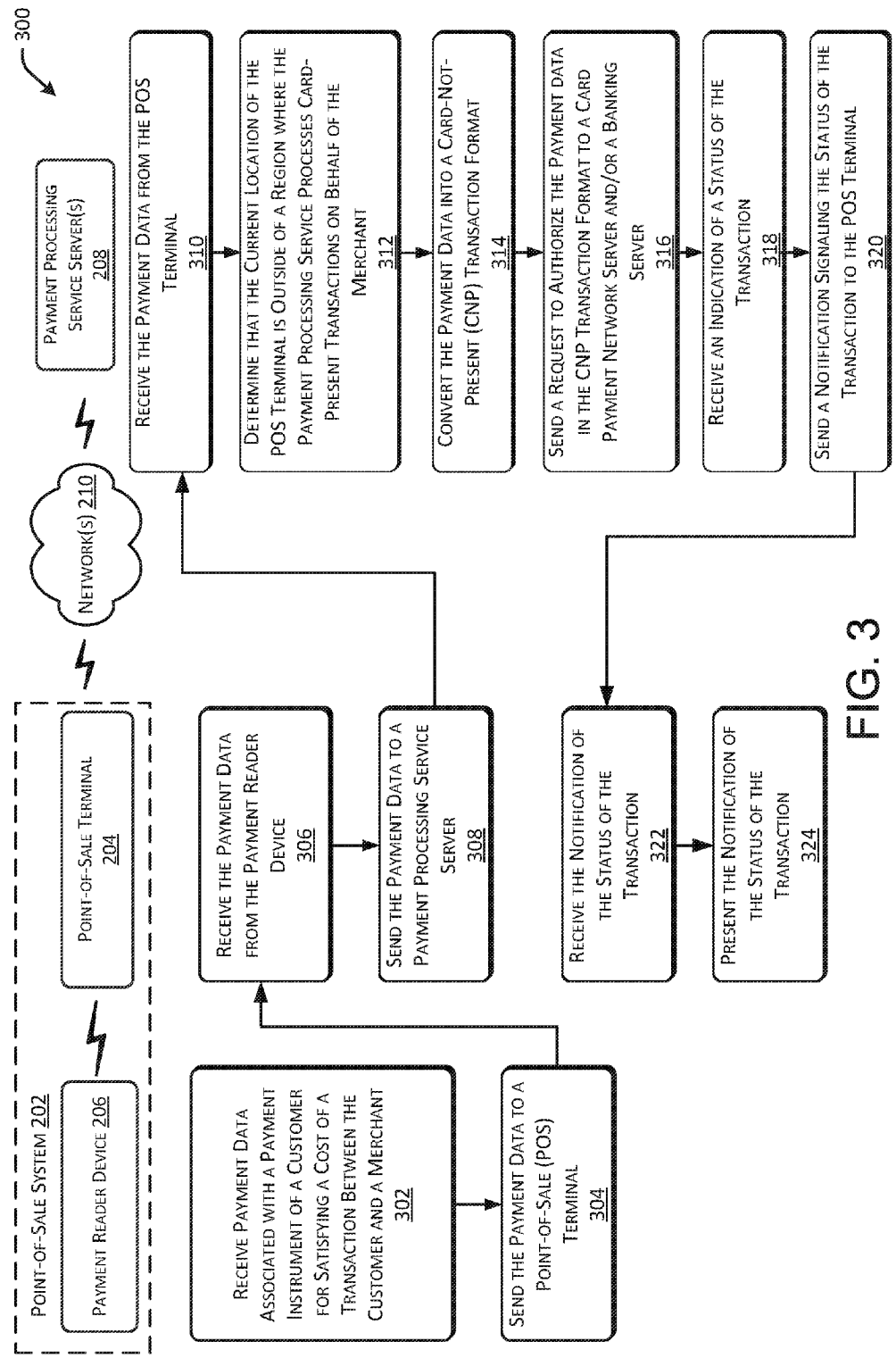
FIG. 3 depicts a non-limiting flow diagram illustrating a method for processing payment data received by the point-of-sale (POS) system via a card-not-present (CNP) transaction instead of a card-present transaction in a particular region.

FIG. 3 depicts a non-limiting flow diagram illustrating a method 300 for processing payment data received by the POS system via a CNP transaction instead of a card-present transaction. FIG. 3 is illustrated in the payment system described above with reference to FIG. 2; however, FIG. 3 should not be limited to such a payment system.

Block 302 illustrates receiving payment data associated with a payment instrument of a customer for satisfying a cost of a transaction between the customer and a merchant. As described above, the payment reader device 206 may include a transaction chip 238, which may perform functionality relating to processing of payment transactions, interfacing with payment instruments, cryptography, and other payment-specific functionality. That is, the transaction chip 238 may access payment data associated with a payment instrument. The payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc. In at least one example, the transaction chip 238 may encrypt the payment data upon receiving the payment data.

Block 304 illustrates sending the payment data to a POS terminal. As described above, the transaction chip 238 may access payment data associated with a payment instrument and may provide the payment data to the transaction data module 228.

Block 306 illustrates receiving the payment data from the payment reader device. The transaction data module 228 may receive the payment data from the transaction chip 238, as described above, and may send the payment data to the payment processing service server(s) 208, as illustrated in block 308.

Block 310 illustrates receiving payment data from the POS terminal. As described above, the transaction data processing module 250 may receive transaction data from the POS system 202. The transaction data may include payment data, user authentication data, purchase amount information, point-of-purchase information, etc. As described above, as a default, payment data associated with the transaction data may be in a card-present transaction format. That is, the payment data may be in a format that may be processed to complete a card-present transaction. In at least one example, the payment data may be encrypted. In such an example, the transaction data processing module 250 may decrypt the payment data. The transaction data processing module 250 may determine how to process the transaction data based on the current location of the POS system 202.

Block 312 illustrates determining that the current location of the POS terminal is outside of a region where the payment processing service processes card-present transactions on behalf of the merchant. As described above, the current location of the POS terminal 204 may indicate the current location of the POS system 202 and accordingly, the current location of the merchant associated with the POS system 202. As described above, the server side location determination module 248 may access data to determine the current location of the POS system 202. In some examples, as described above, a location determination module 226 associated with the POS system 202 may determine the current location of the POS system 202 and the communication module 230 may provide an indication identifying the current location of the POS system 202 to the payment processing service server(s) 208. In such examples, the server side location determination module 248 may determine the current location of the POS system 202 based on the indication from the POS system 202. In other examples, the server side location determination module 248 may receive data (e.g., location data, transaction data, etc.) from the POS system 202 and may determine the current location of the POS system 202 based on the data received from the POS system 202. Additional and/or alternative techniques for determining the current location of the POS system 202 are described above with reference to FIG. 2.

Based at least in part on determining the current location of the POS system 202, the transaction data processing module 250 may determine that the POS system 202 is currently located outside of a region that the payment processing service is authorized to utilize the POS system 202 to process card-present transactions. In at least one example, the transaction data processing module 250 may access data associated with a merchant profile 264 to determine the region(s) where the payment processing service is authorized to process card-present transactions on behalf of the merchant. The transaction data processing module 250 may compare the current location of the POS system 202 with the region(s) where the payment processing service is authorized to process card-present transactions on behalf of the merchant. The transaction data processing module 250 may determine that the current location of the POS system 202 is outside of the region(s) where the payment processing service is authorized to process card-present transactions on behalf of the merchant. Accordingly, the transaction data processing module 250 may provide the payment data in the card-present transaction format to the conversion module 254, instead of the card-present transaction module 252.

Block 314 illustrates converting the payment data into a CNP transaction format. The conversion module 254 may convert the payment data in the card-present transaction format into a CNP transaction format, as described above. A CNP transaction format may be a format of payment data that may be processed to complete a CNP transaction. In an example, the conversion module 254 may extract at least a portion of the payment data that is required for CNP transactions and convert at least the portion of the payment data into a CNP transaction format. In at least one example, the portion of the payment data may include at least a name of the customer, a number associated with the payment instrument, a verification value associated with the payment instrument, and an expiration date associated with the payment instrument. The conversion module 254 may provide the payment data in the CNP transaction format to the card-not-present transaction module 256.

Block 316 illustrates sending a request to authorize the payment data in the CNP transaction format to a card payment network server and/or a banking server. As described above, the card-not-present transaction module 256 may facilitate authorization of the CNP transaction using the payment data in the CNP transaction format. That is, the card-not-present transaction module 256 may send a request for authorization of the payment data for a cost of the transaction to the card payment network server(s) 212 and/or the banking server(s) 214 as if the card-not-present transaction module 256 was processing an online order or other CNP transaction. The card payment network server(s) 212 and/or the banking server(s) 214 may process the payment data in the CNP transaction format, in view of the transaction data and other data associated with the customer, and send a response back to the card-not-present transaction module 256 signaling whether the transaction was successful (i.e., whether the payment data is authorized for the cost of the transaction).

Block 318 illustrates receiving an indication of a status of the transaction. For the purpose of this discussion, a status of a transaction may correspond to whether the transaction was successful (i.e., the payment data is authorized for the cost of the transaction), not successful (i.e., the payment data is not authorized for the cost of the transaction), requires additional information to proceed, etc. In at least one example, the card payment network server(s) 212 and/or the banking server(s) 214 may send a response back to the card-not-present transaction module 256 signaling whether a transaction was successful (i.e., the payment data is authorized for the cost of the transaction). In some examples, if the transaction was not successful (i.e., the payment data is not authorized for the cost of the transaction), the card-not-present transaction module 256 may receive a request for additional information. As described above, other indications may be provided to the card-not-present transaction module 256 to signal the status of the transaction.

Block 320 illustrates sending a notification of the status of the transaction to the POS terminal. In at least one example, based at least in part on the card payment network server(s) 212 and/or the banking server(s) 214 sending a response back to the card-not-present transaction module 256 signaling whether a transaction was successful (i.e., the payment data is authorized for the cost of the transaction), the notification module 258 may send a notification to the communication module 230 signaling that the transaction was successful. In some examples, the card payment network server(s) 212 and/or the banking server(s) 214 may send a response back to the card-not-present transaction module 256 signaling that a transaction was not successful (i.e., the payment data is not authorized for the cost of the transaction). In such examples, the card payment network server(s) 212 and/or the banking server(s) 214 may or may not include a request for additional information. In examples where the card payment network server(s) 212 and/or the banking server(s) 214 do not request additional information, the notification module 258 may send a notification to the communication module 230 signaling that the transaction was not successful. In other examples, additional information may be required for the card payment network server(s) 212 and/or the banking server(s) 214 to authorize a transaction. In such examples, the card payment network server(s) 212 and/or the banking server(s) 214 may send a response back to the card-not-present transaction module 256 signaling that a transaction was not successful (i.e., the payment data is not authorized for the cost of the transaction) and that additional information is needed to complete the transaction. Accordingly, the notification module 258 may send a notification to the communication module 230 signaling that the transaction was not successful and that additional information is needed to complete the transaction.

Block 322 illustrates receiving the notification of the status of the transaction. The communication module 230 may receive the notification of the status of the transaction and may present the notification of the status of the transaction, as shown in block 324. As described above, in some examples, such as a chip card payment instrument, the indication of the status the transaction may be indicated at the POS system 202, for example, at a screen of the POS system 202. In other examples, such as a smart phone or watch operating as a short-range communication payment instrument, information about the transaction and additional information (e.g., receipts, special offers, coupons, or loyalty program information) may be provided to the short-range communication payment instrument for display at a screen of the smart phone or watch or storage in memory.

In an example where additional information may be required for the card payment network server(s) 212 and/or the banking server(s) 214 to authorize a transaction, the notification module 258 may send a notification to the communication module 230 signaling that the transaction was not successful and that additional information is needed to complete the transaction. As described above, in some examples, such as a chip card payment instrument, the notification indicating that the transaction was not successful and requesting additional information may be indicated at the POS system 202, for example, at a screen of the POS system 202. In other examples, such as a smart phone or watch operating as a short-range communication payment instrument, information about the transaction and request for additional information (e.g., receipts, special offers, coupons, or loyalty program information) may be provided to the short-range communication payment instrument for display at a screen of the smart phone or watch or storage in memory.

As a result, the communication module 230 may cause a prompt to be presented to the merchant and/or customer to solicit additional information from the merchant and/or customer, as described above. Based at least in part on receiving the additional information, the card-not-present transaction module 256 may re-send the payment data and the additional information to the card payment network server(s) 212 and/or the banking server(s) 214 to request to authorize the payment data in view of the additional information. The card payment network server(s) 212 and/or the banking server(s) 214 may send a response back to the card-not-present transaction module 256 signaling that a transaction was successful (i.e., the payment data is authorized for the cost of the transaction) and the notification module 258 may send a notification to the communication module 230 signaling that the transaction was successful.

While FIG. 3 illustrates the POS terminal 204 as presenting the notification of the status of the transaction in block 324, it should be noted that in some examples, the payment reader device 206 may present at least part of the notification of the status of the transaction. For instance, in some examples, the payment reader device 206 may output a sound or emit a light to communicate the status of the transaction to the merchant and/or customer.

Figure 4:
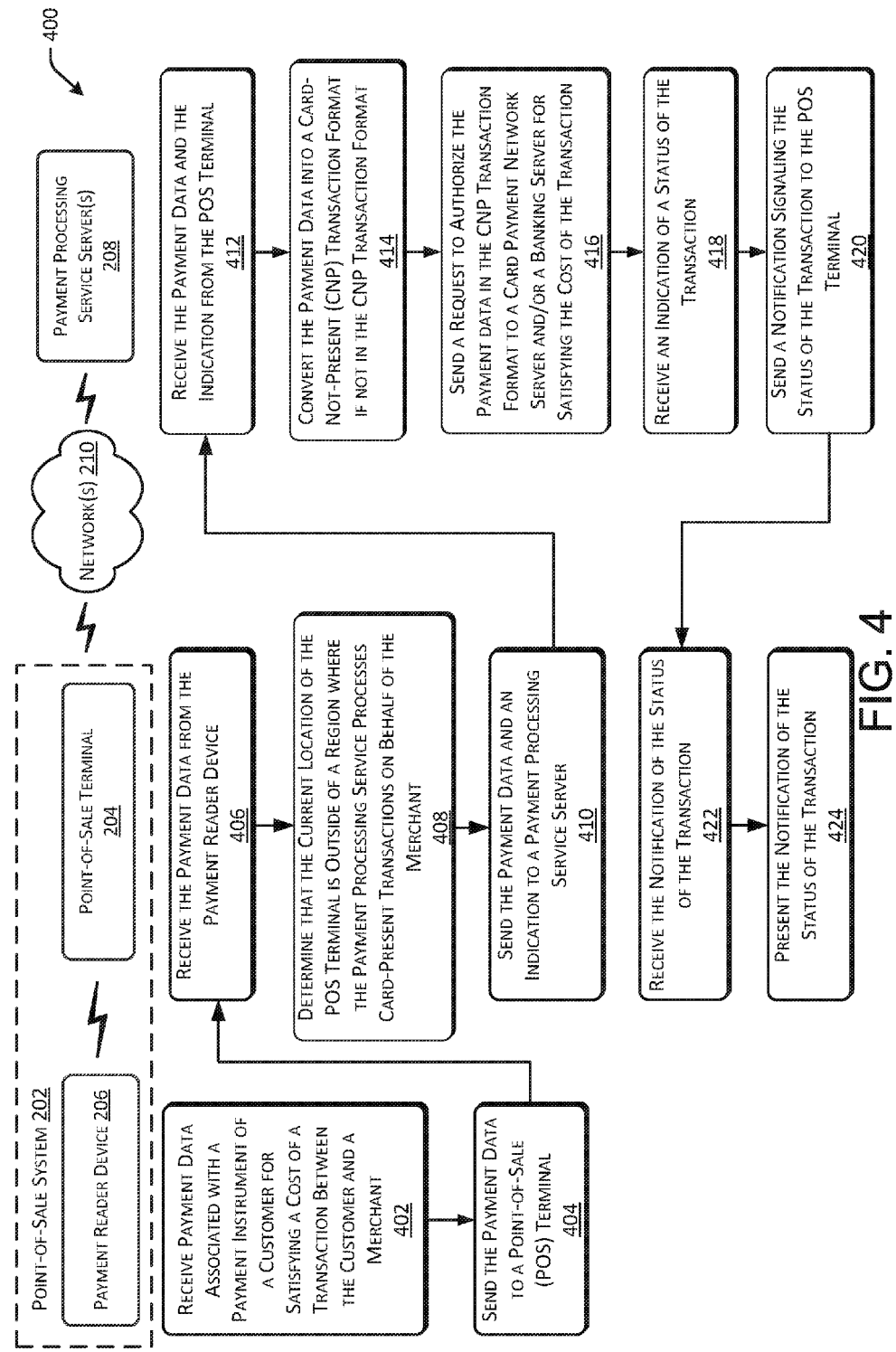
FIG. 4 depicts a non-limiting flow diagram illustrating a method for processing payment data received by the POS system via a CNP transaction instead of a card-present transaction in a particular region.

FIG. 4 depicts a non-limiting flow diagram illustrating a method 400 for processing payment data received by the POS system via a CNP transaction instead of a card-present transaction. FIG. 4 is illustrated in the payment system described above with reference to FIG. 2; however, FIG. 4 should not be limited to such a payment system.

Block 402 illustrates receiving payment data associated with a payment instrument of a customer for satisfying a cost of a transaction between the customer and a merchant. As described above, the payment reader device 206 may include a transaction chip 238, which may perform functionality relating to processing of payment transactions, interfacing with payment instruments, cryptography, and other payment-specific functionality. That is, the transaction chip 238 may access payment data associated with a payment instrument. The payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc. Additionally, the transaction chip 238 may encrypt the payment data upon receiving the payment data.

Block 404 illustrates sending the payment data to a POS terminal. As described above, the transaction chip 238 may access payment data associated with a payment instrument and may provide the payment data to the transaction data module 228.

Block 406 illustrates receiving the payment data from the payment reader device. The transaction data module 228 may receive the payment data from the transaction chip 238, as described above.

Block 408 illustrates determining that a current location of the POS terminal is outside of a region where the payment processing service processes card-present transactions on behalf of the merchant. As described above, the current location of the POS terminal 204 may indicate the current location of the POS system 202 and accordingly, the current location of the merchant associated with the POS system 202. In an example, the location determination module 226 may determine a current location of the POS system 202. In at least one example, the location determination module 226 may prompt the merchant associated with the POS system 202 to expressly indicate its current location. In additional and/or alternative examples, the location determination module 226 may receive location data from the GPS sensor 220, geographic location information associated with the IP address that the POS terminal 204 is using to communicate via the network(s) 210, transaction data, event data, etc. and the location determination module 226 may determine the current location of the POS system 202 based on the location data, geographic location information associated with the IP address, transaction data, etc., as described above. Moreover, in an additional and/or alternative example, the location determination module 226 may access settings associated with one or more applications running on the POS terminal 204 to determine the current location of the POS system 202.

Based at least in part on determining the current location of the POS system 202, the location determination module 226 may determine that the current location of the POS system 202 is outside of one of the region(s) where the payment processing service is authorized to process card-present transactions on behalf of the merchant. For instance, the location determination module 226 may access data associated with a merchant profile 231 to determine the region(s) where the payment processing service is authorized to process card-present transactions on behalf of the merchant. The location determination module 226 may compare the current location of the POS system 202 with the region(s) where the payment processing service is authorized to process card-present transactions on behalf of the merchant. That is, the location determination module 226 may utilize the current location of the POS system 202, determined as described above, to determine that the POS system 202 is in a region where the payment processing service is not authorized to process card-present transactions on behalf of the merchant.

As described above, in some examples, the POS conversion module 229 may convert the payment data from a card-present transaction format to a CNP transaction format based at least in part on a determination that the POS system 202 is in a region where the payment processing service is not authorized to process card-present transactions on behalf of the merchant.

Block 410 illustrates sending the payment data and an indication to a payment processing service server. The communication module 230 may send transaction data to the payment processing service server(s) 208. Additionally, the communication module 230 may send an indication to the payment processing service server(s) 208 signaling that the POS system 202 is outside of the region(s) that the payment processing service is authorized to process card-present transactions on behalf of the merchant. In at least one example, such an indication may be sent with the payment data. In alternative examples, such an indication may be sent at a predetermined frequency, after a lapse of a predetermined period of time, any time the POS system 202 changes locations, etc. In some examples, the payment data may be in a CNP transaction format, as described above.

Block 412 illustrates receiving payment data and the indication from the POS terminal. The transaction data processing module 250 may receive transaction data from the POS system 202. As described above, the transaction data may include payment data, user authentication data, purchase amount information, point-of-purchase information, etc. As described above, as a default, payment data associated with the transaction data may be in a card-present transaction format. That is, the payment data may be in a format that may be processed to complete a card-present transaction. In other examples, the payment data may be in a CNP transaction format. In at least one example, the payment data may be encrypted. In such examples, the transaction data processing module 250 may decrypt the payment data prior to sending the payment data to the conversion module 254.

In addition to the transaction data, the transaction data processing module 250 may receive the indication that the POS system 202 is located outside of the region that the payment processing service is authorized to utilize the POS system 202 to process card-present transactions. In at least one example, the indication may include an instruction to send the payment data directly to the conversion module 254. In such examples, the transaction data processing module 250 may provide the payment data directly to the conversion module 254, without considering the current location of the POS system 202. In at least one alternative example, the indication may include an instruction to send the payment data directly to the card-not-present transaction module 256. In such examples, the transaction data processing module 250 may provide the payment data, which is already in a CNP transaction format, directly to the card not present transaction module 256, without considering the current location of the POS system 202 or converting the payment data into the CNP transaction format.

Block 414 illustrates converting the payment data into a CNP transaction format, if the payment data is not already in the CNP transaction format. In at least one example, if the payment data is not already in a CNP transaction format, the conversion module 254 may convert the payment data in the card-present transaction format into a CNP transaction format, as described above. A CNP transaction format may be a format of payment data that may be processed to complete a CNP transaction. In an example, the conversion module 254 may extract at least a portion of the payment data that is required for CNP transactions and convert at least the portion of the payment data into a CNP transaction format. In at least one example, the portion of the payment data may include at least a name of the customer, a number associated with the payment instrument, a verification value associated with the payment instrument, and an expiration date associated with the payment instrument. The conversion module 254 may provide the payment data in the CNP transaction format to the card-not-present transaction module 256.

Block 416 illustrates sending a request to authorize the payment data in the CNP transaction format to a card payment network server and/or a banking server for satisfying a cost of a transaction. As described above, the card-not-present transaction module 256 may facilitate authorization of the CNP transaction using the payment data in the CNP transaction format. That is, the card-not-present transaction module 256 may send a request for authorization of the payment data for a cost of the transaction to the card payment network server(s) 212 and/or the banking server(s) 214 as if the card-not-present transaction module 256 was processing an online order or other CNP transaction. The card payment network server(s) 212 and/or the banking server(s) 214 may process the payment data in the CNP transaction format, in view of the transaction data and other data associated with the customer, and send a response back to the card-not-present transaction module 256 signaling whether the transaction was successful (i.e., whether the payment data is authorized for the cost of the transaction).

Block 418 illustrates receiving an indication of a status of the transaction. In at least one example, the card payment network server(s) 212 and/or the banking server(s) 214 may send a response back to the card-not-present transaction module 256 signaling whether a transaction was successful (i.e., the payment data is authorized for the cost of the transaction). In some examples, if the transaction was not successful (i.e., the payment data is not authorized for the cost of the transaction), the card-not-present transaction module 256 may receive a request for additional information. As described above, other indications may be provided to the card-not-present transaction module 256 to signal the status of the transaction.

Block 420 illustrates sending a notification of the status of the transaction to the POS terminal. In at least one example, based at least in part on the card payment network server(s) 212 and/or the banking server(s) 214 sending a response back to the card-not-present transaction module 256 signaling whether a transaction was successful (i.e., the payment data is authorized for the cost of the transaction), the notification module 258 may send a notification to the communication module 230 signaling that the transaction was successful. In some examples, the card payment network server(s) 212 and/or the banking server(s) 214 may send a response back to the card-not-present transaction module 256 signaling that a transaction was not successful (i.e., the payment data is not authorized for the cost of the transaction). In such examples, the card payment network server(s) 212 and/or the banking server(s) 214 may or may not include a request for additional information. In examples where the card payment network server(s) 212 and/or the banking server(s) 214 do not request additional information, the notification module 258 may send a notification to the communication module 230 signaling that the transaction was not successful. In other examples, additional information may be required for the card payment network server(s) 212 and/or the banking server(s) 214 to authorize a transaction. In such examples, the card payment network server(s) 212 and/or the banking server(s) 214 may send a response back to the card-not-present transaction module 256 signaling that a transaction was not successful (i.e., the payment data is not authorized for the cost of the transaction) and that additional information is needed to complete the transaction. Accordingly, the notification module 258 may send a notification to the communication module 230 signaling that the transaction was not successful and that additional information is needed to complete the transaction.

Block 422 illustrates receiving the notification of the status of the transaction. The communication module 230 may receive the notification of the status of the transaction and may present the notification of the status of the transaction, as shown in block 424. As described above, in some examples, such as a chip card payment instrument, the indication of the status the transaction may be indicated at the POS system 202, for example, at a screen of the POS system 202. In other examples, such as a smart phone or watch operating as a short-range communication payment instrument, information about the transaction and additional information (e.g., receipts, special offers, coupons, or loyalty program information) may be provided to the short-range communication payment instrument for display at a screen of the smart phone or watch or storage in memory.

In an example where additional information may be required for the card payment network server(s) 212 and/or the banking server(s) 214 to authorize a transaction, the notification module 258 may send a notification to the communication module 230 signaling that the transaction was not successful and that additional information is needed to complete the transaction. As described above, in some examples, such as a chip card payment instrument, the notification indicating that the transaction was not successful and requesting additional information may be indicated at the POS system 202, for example, at a screen of the POS system 202. In other examples, such as a smart phone or watch operating as a short-range communication payment instrument, information about the transaction and request for additional information (e.g., receipts, special offers, coupons, or loyalty program information) may be provided to the short-range communication payment instrument for display at a screen of the smart phone or watch or storage in memory.

As a result, the communication module 230 may cause a prompt to be presented to the merchant and/or customer to solicit additional information from the merchant and/or customer, as described above. Based at least in part on receiving the additional information, the card-not-present transaction module 256 may re-send the payment data and the additional information to the card payment network server(s) 212 and/or the banking server(s) 214 to request to authorize the payment data in view of the additional information. The card payment network server(s) 212 and/or the banking server(s) 214 may send a response back to the card-not-present transaction module 256 signaling that a transaction was successful (i.e., the payment data is authorized for the cost of the transaction) and the notification module 258 may send a notification to the communication module 230 signaling that the transaction was successful.

While FIG. 4 illustrates the POS terminal 204 as presenting the notification of the status of the transaction in block 424, it should be noted that in some examples, the payment reader device 206 may present at least part of the notification of the status of the transaction. For instance, in some examples, the payment reader device 206 may output a sound or emit a light to communicate the status of the transaction to the merchant and/or customer.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A payment system for enabling transactions via a point-of-sale (POS) system of a merchant that is currently located outside of a particular region that the merchant utilizes a payment processing service for processing card-present transactions, the payment processing service facilitating transactions between merchants and customers using payment data received from respective payment reader devices of the merchants, the payment system comprising:
   a payment reader device coupled to a POS terminal of the POS system of the merchant, the payment reader device configured to:
   receive payment data associated with a payment instrument of a customer for satisfying a cost of a transaction between the merchant and the customer, the payment data being obtained from a dip, a tap, or a swipe of the payment instrument via the payment reader device; and
   provide the payment data to the POS terminal;
   a POS application stored on the POS terminal, the POS application comprising instructions to:
   determine, based at least in part on a global positioning system (GPS) sensor associated with the POS terminal, location data indicating a current location of the POS terminal;
   encrypt the payment data;
   based at least in part on encrypting the payment data, send the payment data to a server-side application stored on a first server; and
   send the location data to the server-side application; and
   the server-side application, comprising instructions to:
   receive the payment data from the POS terminal, the payment data being in a first format corresponding to a card-present transaction;
   decrypt the payment data;
   receive the location data from the POS terminal;
   determine, based at least in part on the location data, that the current location of the POS terminal is outside of the particular region;
   convert, based at least in part on determining that the current location of the POS terminal is outside of the particular region, the payment data from the first format to a second format corresponding to a card-not-present transaction, card-not-present transactions being associated with transactions where neither customers nor payment instruments are physically present at respective POSs of the transactions;
   send a request to authorize the payment data in the second format to a second server associated with a payment processing service provider, the payment processing service provider being associated with the payment instrument for satisfying the cost of the transaction;
   receive, from the second server, authorization of the payment data in the second format for the cost of the transaction; and
   send an indication of the authorization to the POS terminal of the POS system of the merchant, the indication signaling to the merchant that the transaction is authorized notwithstanding the merchant being located outside of the particular region that the merchant utilizes the payment processing service for processing card-present transactions.

2. The payment system of claim 1, the payment data including at least one of a name of the customer, an address of the customer, a number associated with the payment instrument, a verification value associated with the payment instrument, or a primary account number corresponding to the customer.

3. The payment system of claim 1, the server-side application further comprising instructions to send the payment data in the second format to a first application programming interface for processing card-not-present transactions instead of a second application programming interface for processing card-present transactions, the first application programming interface sending the request to authorize the payment data and receiving the authorization of the payment data.

4. A computer-implemented method for processing payment data based on a location of a point-of-sale (POS) system of a merchant, the computer-implemented method comprising:
   receiving, via an application associated with the POS system, first payment data to satisfy a cost of a transaction between a customer and the merchant, the first payment data being obtained from a dip, a tap, or a swipe of a payment instrument of the customer via a payment reader associated with the POS system at the location of the POS system;
   encrypting, by the application, the first payment data;
   sending, by the application, the first payment data to a server computing device;
   receiving, by the server computing device, the first payment data;
   decrypting, by the server computing device, the first payment data;
   receiving, by the server computing device, location data identifying the location of the POS system, the location data generated by a global positioning system (GPS) sensor associated with the POS system;
   determining, by the server computing device and based at least in part on the location data, that the location of the POS system is outside of a region where the merchant utilizes a payment processing service to perform card-present transactions;
   extracting, by the server computing device, a portion of the first payment data, the portion of the first payment data corresponding to information required for card-not-present transactions, the information including at least one of a name of the customer, an address of the customer, a number associated with the payment instrument of the customer, or a verification value associated with the payment instrument;
   converting, by the server computing device, the portion of the first payment data into a card-not-present transaction format;
   facilitating, by the server computing device and based at least in part on the portion of the first payment data that is in the card-not-present transaction format, a card-not-present transaction to authorize the payment instrument for the cost of the transaction; and
   sending, by the server computing device, a notification to the POS system to indicate that the transaction is authorized.

5. The computer-implemented method of claim 4, wherein determining that the location of the POS system is outside of the region further comprises:
   accessing an IP address associated with the transaction; and
   determining that the IP address originated outside of the region.

6. The computer-implemented method of claim 4, wherein determining that the location of the POS system is outside of the region further comprises:
   accessing a calendar associated with a merchant indicating an event outside of the region; and
   determining that the transaction is associated with the event.

7. The computer-implemented method of claim 4, wherein determining that the location of the POS system is outside of the region further comprises:
   receiving, from the POS system, second payment data associated with two or more transactions;
   determining that the second payment data is associated with payment instruments associated with a particular region; and
   determining that the particular region is outside of the region.

8. The computer-implemented method of claim 4, wherein determining that the location of the POS system is outside of the region is further based on receiving an indication from the POS system signaling that the POS system is located outside of the region.

9. The computer-implemented method of claim 4, wherein facilitating the card-not-present transaction to authorize the payment instrument for the cost of the transaction comprises:
   sending, to a server associated with a payment processing service provider, a request to authorize the portion of the first payment data for the cost of the transaction; and
   receiving, from the server, authorization of the portion of the first payment data for the cost of the transaction.

10. A system to process payment data associated with a customer based on a location of a point-of-sale (POS) system associated with the system, the system comprising:
    an application stored on the POS system, the application comprising first instructions to:
      receive, for a transaction between the customer and a merchant, payment data obtained from a dip, a tap, or a swipe of a payment instrument of the customer via a payment reader associated with the POS system, the payment data being in a first format corresponding to a card-present transaction;
      encrypt the payment data; and
      send the payment data to one or more servers; and
    the one or more servers comprising:
      one or more processors;
      one or more non-transitory computer-readable media storing second instructions executable by the one or more processor to:
        receive location data indicating the location of the POS system, the location data generated by a global positioning system (GPS) sensor associated with the POS system;
        determine, based at least in part on the location data, that the POS system moved from a first location corresponding to a region where a merchant associated with the POS system utilizes a payment processing service to process card-present transactions to a second location, the second location corresponding to a different region;
        receive the payment data from the application;
        decrypt the payment data;

convert at least a portion of the payment data from the first format to a second format associated with a card-not-present transaction;

facilitate, based at least in part on the portion of the payment data, a card-not-present transaction to authorize the payment instrument for a cost of the transaction; and send a notification to the application to indicate whether the transaction is authorized.

11. A system as recited in claim 10, wherein the second instructions are further executable by the one or more processors to:

receive an indication that the payment instrument is authorized for the cost of the transaction; and send the notification to the application responsive to receiving the indication.

12. A system as recited in claim 10, wherein the second instructions are further executable by the one or more processors to:

receive a first indication that the payment instrument is not authorized for the cost of the transaction and that additional information is required to authorize the payment instrument; and send, in association with the notification, a second indication signaling to the merchant that the transaction is not authorized and prompting the merchant for the additional information.

13. A system as recited in claim 12, wherein the second instructions are further executable by the one or more processors to:

receive the additional information;

facilitate another card-not-present transaction to authorize the payment instrument for the cost of the transaction in view of the additional information;

receive a third indication that the payment instrument is authorized for the cost of the transaction; and send another notification to the POS system signaling to the merchant that the transaction is authorized.

14. A system as recited in claim 10, wherein the second instructions are further executable by the one or more processors to:

receive a first indication that the payment instrument is not authorized for the cost of the transaction; and send, in association with the notification, a second indication signaling to the merchant that the transaction is not authorized for the transaction.

15. A system as recited in claim 10, wherein the second instructions are further executable by the one or more processors to, at least partly prior to converting the portion of the payment data from the first format to the second format:

determine one or more data items of payment data used to complete the card-not-present transaction, the one or more data items comprising the portion of the payment data; and extract the one or more data items from the payment data, the one or more data items including at least one of a name of the customer, an address of the customer, a number associated with the payment instrument, or a verification value associated with the payment instrument.

16. A system as recited in claim 10, wherein converting at least the portion of the payment data from the first format to the second format and facilitating the card-not-present transaction to authorize the payment instrument for the cost of the transaction are performed without additional input from the customer or an agent of the merchant.

17. The payment system of claim 1, the server-side application further comprising instructions to:

access an IP address associated with a transmission of the payment data;

determine that the IP address originated outside of the particular region; and determine that the current location of the POS terminal is outside of the particular region based at least in part the IP address originating outside of the particular region.

18. The payment system of claim 1, wherein converting, based at least in part on determining that the current location of the POS terminal is outside of the particular region, the payment data from the first format to the second format corresponding to the card-not-present transaction is performed without additional input from the customer or an agent of the merchant.

19. A system as recited in claim 10, wherein the second instructions are further executable by the one or more processors to:

access an IP address associated with a transmission of the payment data;

determine that the IP address originated in the second location; and determine that the POS system moved from the first location to the second location based at least in part on the IP address originating in the second location.

20. A system as recited in claim 10, wherein the second instructions are further executable by the one or more processors to:

receive, from the POS system, additional payment data associated with two or more transactions;

determine that the additional payment data is associated with payment instruments associated with the second location; and determine that the POS system moved from the first location to the second location based at least in part on the additional payment data being associated with payment instruments associated with the second location.

21. A system as recited in claim 10, wherein converting at least the portion of the payment data from the first format to the second format is performed without additional input from the customer or an agent of the merchant.

* * * * *